US010240741B2

(12) United States Patent
Harrington, Jr.

(10) Patent No.: US 10,240,741 B2
(45) Date of Patent: Mar. 26, 2019

(54) FOG LAMP LENS AND ASSEMBLY

(71) Applicant: MYOTEK HOLDINGS, INC., Irvine, CA (US)

(72) Inventor: Robert T. Harrington, Jr., Laguna Beach, CA (US)

(73) Assignee: Myotek Holdings, Inc., Irvine, CA (US)

(*) Notice: Subject to any disclaimer, the term of this patent is extended or adjusted under 35 U.S.C. 154(b) by 0 days.

(21) Appl. No.: 15/328,123

(22) PCT Filed: Jul. 23, 2015

(86) PCT No.: PCT/US2015/041718
§ 371 (c)(1),
(2) Date: Jan. 23, 2017

(87) PCT Pub. No.: WO2016/014785
PCT Pub. Date: Jan. 28, 2016

(65) Prior Publication Data
US 2017/0211774 A1 Jul. 27, 2017

Related U.S. Application Data

(60) Provisional application No. 62/027,867, filed on Jul. 23, 2014.

(51) Int. Cl.
B60Q 1/20 (2006.01)
F21S 41/32 (2018.01)
(Continued)

(52) U.S. Cl.
CPC ............. F21S 41/255 (2018.01); B60Q 1/20 (2013.01); F21S 41/275 (2018.01); F21S 41/29 (2018.01);
(Continued)

(58) Field of Classification Search
CPC ........ F21S 41/255; F21S 41/275; F21S 41/32; F21S 45/10; F21S 48/1258; F21S 48/1283; F21S 48/1317; F21S 48/31; B60Q 1/20
(Continued)

(56) References Cited

U.S. PATENT DOCUMENTS 1,955,599 A 4/1934 Lamblin-Parent
2,275,602 A 3/1942 Beck et al.
(Continued)

FOREIGN PATENT DOCUMENTS

DE 3602262 A1 5/1987
DE 4031352 A1 4/1992
(Continued)

OTHER PUBLICATIONS

PCT Search Report and Written Opinion for PCT/US2015/041718, completed Nov. 30, 2015.
(Continued)

Primary Examiner — Tsion Tumebo
(74) Attorney, Agent, or Firm — Barnes & Thornburg LLP

(57) ABSTRACT

A fog lamp for use in an automobile includes a light source, a reflector, and a condenser lens. The front surface of the condenser lens includes an emission region and two diffusion regions. The diffusion regions have a surface treatment that diffuses transmitted light, such as knurling, frosting, texturing, or pillowing. Light emitted by the light source is directed by the reflector through the condenser lens and exits the condenser lens through the emission region. Light that enters the condenser lens through one of the diffusion regions from outside of the lamp, such as solar light, is diffused and reduced in intensity. The diffusion regions may be positioned relative to a back surface of the lens to cause
(Continued)

the diffused light to be reflected due to total internal reflection. The diffused light may exit the lens through the other diffusion region and become further diffused and reduced in intensity.

17 Claims, 6 Drawing Sheets

(51) Int. Cl.
    *F21S 41/29*     (2018.01)
    *F21S 45/10*     (2018.01)
    *F21S 41/255*     (2018.01)
    *F21S 41/275*     (2018.01)

(52) U.S. Cl.
    CPC ............. *F21S 41/32* (2018.01); *F21S 41/322* (2018.01); *F21S 45/10* (2018.01)

(58) Field of Classification Search
    USPC ......................................................... 362/520
    See application file for complete search history.

(56) References Cited

U.S. PATENT DOCUMENTS

| | | | | |
|---|---|---|---|---|
| 4,340,283 A * | 7/1982 | Cohen | ................... | G02B 5/1895 351/159.41 |
| 4,630,184 A | 12/1986 | Ferrero | | |
| 4,796,171 A * | 1/1989 | Lindae | ................... | F21V 5/002 362/308 |
| 4,851,968 A * | 7/1989 | Nino | ................... | F21S 48/1145 362/299 |
| 4,949,226 A * | 8/1990 | Makita | ................. | B60Q 1/0041 362/538 |
| 5,383,102 A | 1/1995 | Jones | | |
| 5,897,196 A * | 4/1999 | Soskind | ................... | F21S 41/28 362/507 |
| 6,616,299 B2 * | 9/2003 | Martineau | ............... | F21V 5/045 362/235 |
| 6,891,333 B2 | 5/2005 | Tatsukawa et al. | | |
| 7,025,483 B2 * | 4/2006 | Albou | ..................... | G02B 3/00 362/538 |
| 7,654,713 B2 * | 2/2010 | Tendo | ................... | F21S 41/275 362/538 |
| 8,070,339 B2 * | 12/2011 | Koike | ................... | F21S 41/275 362/538 |
| 9,429,292 B2 * | 8/2016 | Choi | ....................... | F21S 41/19 |
| 2010/0284197 A1 * | 11/2010 | Kiesel | ..................... | F21V 5/002 362/507 |
| 2014/0211491 A1 * | 7/2014 | Harrington, Jr. | ..... | F21S 41/336 362/487 |
| 2016/0033104 A1 * | 2/2016 | Larsen | .................... | F21S 48/31 362/520 |

FOREIGN PATENT DOCUMENTS

| | | |
|---|---|---|
| DE | 19803986 A1 | 8/1998 |
| EP | 2442016 A2 | 4/2012 |
| JP | 2009199778 A | 9/2009 |
| JP | 2014063604 A | 4/2014 |

OTHER PUBLICATIONS

Extended European Search Report for European Patent Application No. 15823955.8, dated Feb. 23, 2018, 6 pages.

* cited by examiner

FOG LAMP LENS AND ASSEMBLY

CROSS REFERENCE TO RELATED APPLICATIONS

This application is a national stage entry under 35 USC § 371(b) of PCT International Application No. PCT/US2015/041718, filed Jul. 23, 2015, and claims priority to U.S. Provisional Application Ser. No. 62/027,867 filed on Jul. 23, 2014, the disclosure of both of which are hereby expressly incorporated by reference in their entirety.

TECHNICAL FIELD

The present disclosure relates generally to automotive forward lighting and, more particularly, to an automotive fog lamp.

BACKGROUND

Automotive fog lamps are auxiliary forward lighting devices mounted in the front fascia of an automobile. Fog lamps direct light low and toward the ground to provide improved visibility during poor weather conditions. Typical "projector" automotive fog lamps include a halogen light bulb surrounded by a polyellipsoidal reflector, which is covered by a glass aspheric condenser lens. Light produced by the bulb is directed by the reflector through the lens and focused outward, typically toward the roadway.

In certain circumstances, the condenser lens of a typical fog lamp may reflect and concentrate incoming solar light rays. In particular, solar light rays incoming from certain angles may be reflected off of the back surface of the lens due to a phenomenon known as total internal reflection. The reflected solar light rays may be concentrated at a particular focal point outside of the condenser lens. For certain vehicle and fog-lamp combinations, the focal point may be located on or near the vehicle fascia or other part of the vehicle. In those vehicles, the vehicle fascia, which is typically constructed of plastic, may melt or otherwise be damaged due to excessive solar heating. Redesigning the vehicle fascia to reduce solar effects associated with fog lamps may be expensive or impossible.

SUMMARY

According to one aspect of the disclosure, an automotive lamp is disclosed. The automotive lamp includes a condenser lens and a lamp assembly operable to generate and direct light through the condenser lens. The condenser lens has a convex front surface and a back surface. The front surface has a center point, a first region that is substantially smooth and includes the center point, and a second region including a surface treatment configured to diffuse light rays. When the lamp assembly is energized, all of the light generated by the lamp assembly is directed through the first region, and the second region is positioned relative to the back surface such that when a light ray enters the lamp through the second region, the second region and the back surface cooperate to diffuse the light ray into a plurality of child light rays that are directed out of the lamp through the front surface. In some embodiments, the back surface of the condenser lens may be substantially flat. In some embodiments, the first region may be adjacent to the second region, and an imaginary plane perpendicular to the back surface may intersect the front surface to define a boundary between the first region and the second region.

In some embodiments, the front surface of the condenser lens may further include a third region spaced apart from the second region, wherein the third region has the surface treatment configured to diffuse light rays, and the third region is positioned relative to the back surface such that when the light ray enters the lamp through the second region, the child light rays exit the lamp through the third region and are diffused by the third region into a second plurality of child light rays. The first region may be adjacent to the second region and adjacent to the third region, the second region may extend from the first region to an inboard edge of the front surface of the condenser lens, and the third region may extend from the first region to an outboard edge of the front surface of the condenser lens. A first imaginary plane perpendicular to the back surface may intersect the front surface to define a first boundary between the first region and the second region, and a second imaginary plane perpendicular to the back surface may intersect the front surface to define a second boundary between the first region and the third region. The first boundary and the second boundary may be spaced apart by a width of the first region.

In some embodiments, the surface treatment of the second region may include a frosted surface treatment, a knurled surface treatment, or a pillow optics surface treatment. The knurled surface treatment may include a series of horizontal lines or a series of curved lines. In some embodiments, the front surface of the condenser lens may be embodied as an aspheric lens surface. In some embodiments, the lamp assembly may include a polyellipsoidal reflector. In some embodiments, the lamp assembly may include a halogen bulb or a light-emitting diode. In some embodiments, the automotive lamp may further include an external housing adapted for installation in an automobile, wherein the condenser lens is adapted to fit through an opening in a front fascia of the automobile.

According to another aspect, a condenser lens for an automotive lamp includes a convex front surface and a back surface positioned behind the front surface. The front surface has a circular perimeter, a center point, a first region that is substantially smooth and includes the center point, and a second region including a surface treatment configured to diffuse light rays. The second region is positioned relative to the back surface such that when a light ray enters the condenser lens through the second region, the second region and the back surface cooperate to diffuse the light ray into a plurality of child light rays that are directed out of the lamp through the front surface.

In some embodiments, the back surface may be substantially flat. In some embodiments, the first region may be adjacent to the second region, and an imaginary plane positioned at an angle relative to the back surface may intersect the front surface to define a boundary between the first region and the second region. The imaginary plane may be perpendicular to the back surface.

In some embodiments, the front surface of the condenser lens may further include a third region spaced apart from the second region, wherein the third region has the surface treatment configured to diffuse light rays, and the third region is positioned relative to the back surface such that when the light ray enters the condenser lens through the second region, the child light rays exit the condenser lens through the third region and are diffused by the third region into a second plurality of child light rays.

In some embodiments, the first region may be adjacent to the second region and adjacent to the third region, the second region may extend from the first region to a first point on the circular perimeter of the front surface of the condenser lens, and the third region may extend from the first region to a second point on the circular perimeter of the front surface of the condenser lens, wherein the second point is opposite the first point. A first imaginary plane perpendicular to the back surface may intersect the front surface to define a first boundary between the first region and the second region, and a second imaginary plane perpendicular to the back surface and parallel to the first imaginary plane may intersect the front surface to define a second boundary between the first region and the third region. The first boundary and the second boundary may be spaced apart by a width of the first region. The width of the first region may have a predefined relationship to a diameter of the circular perimeter of the front surface. The second region and the third region may be of equal width.

In some embodiments, the surface treatment of the second region may include a frosted surface treatment, a knurled surface treatment, or a pillow optics surface treatment. The knurled surface treatment comprises a series of straight lines or a series of curved lines.

According to another aspect, an automotive lamp includes a condenser lens having an aspheric front surface and a substantially flat back surface, a polyellipsoidal reflector positioned behind the condenser lens, a support coupled between the reflector and the condenser lens, and a light source positioned behind the condenser lens, wherein the light source and the polyellipsoidal reflector are operable to generate and direct light through the condenser lens. The front surface has a center point, a first region that is substantially smooth and includes the center point, and a second region including a surface treatment configured to diffuse light rays. When the light source is energized, all of the light generated by the light source and reflected by the polyellipsoidal reflector is directed through the first region, and the second region is positioned relative to the back surface such that when a light ray enters the lamp through the second region, the second region and the back surface cooperate to diffuse the light ray into a plurality of child light rays that are directed out of the lamp through the front surface.

In some embodiments, the front surface of the condenser lens further includes a third region spaced apart from the second region, wherein the third region has the surface treatment configured to diffuse light rays, and the third region is positioned relative to the back surface such that when the light ray enters the lamp through the second region, the child light rays exit the lamp through the third region and are diffused by the third region into a second plurality of child light rays.

According to another aspect, a method includes activating a lamp for an automobile to generate light, directing all of the generated light through a first surface region of the lamp, the first surface region being substantially smooth, diffusing a light ray entering the lamp through a second surface region of the lamp, the second surface region including a surface treatment that diffuses transmitted light, and reflecting the diffused light ray out of the lamp, wherein the diffused light ray includes a plurality of child light rays. In some embodiments, reflecting the diffused light ray out of the lamp may include reflecting the plurality of child light rays out of the lamp through a third surface region of the lamp, the third surface region including the surface treatment that diffuses transmitted light, and diffusing the plurality of child light rays exiting the lamp through the third surface region.

BRIEF DESCRIPTION OF THE DRAWINGS

The detailed description particularly refers to the following figures, in which.

DETAILED DESCRIPTION OF THE DRAWINGS

Figure 1:
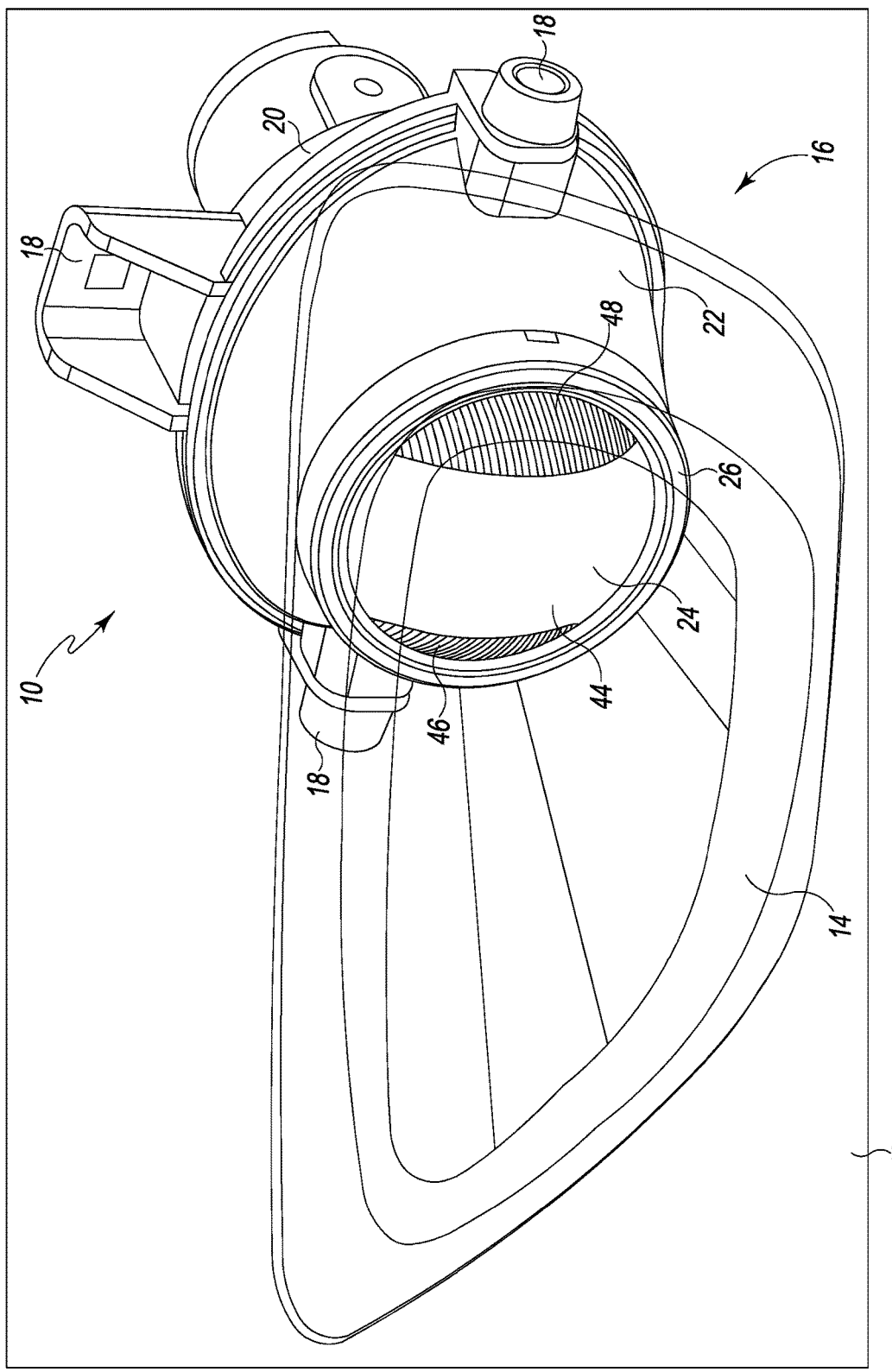
FIG. 1 is a perspective view of a fog lamp positioned in a fascia of an automobile.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 2:
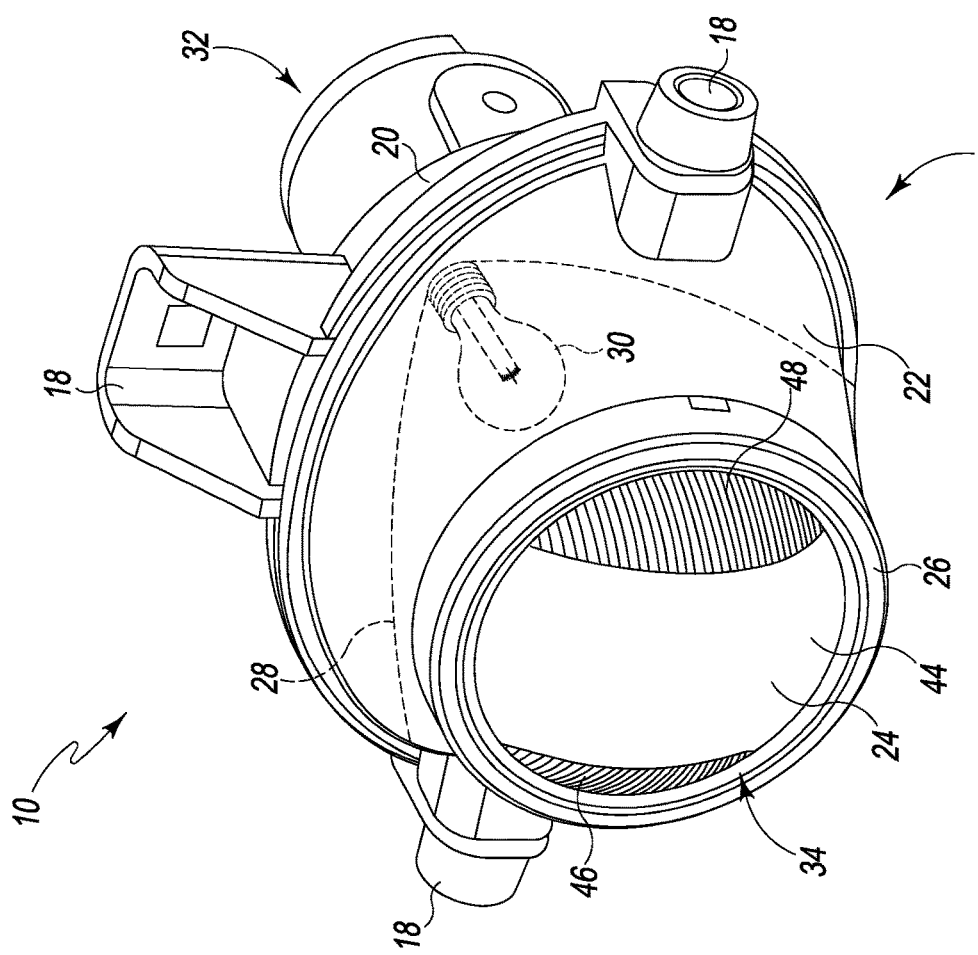
FIG. 2 is a perspective view of the fog lamp of FIG. 1.

Referring now to FIGS. 1 and 2, a fog lamp 10 is shown. Although illustrated as a fog lamp 10, it should be understood that the lamp 10 may also be embodied as any projector-type automotive lamp, including without limitation a headlamp, a high-beam lamp, a driving light, or a daytime running light. The fog lamp 10 is positioned in a front fascia 12 of an automobile. The front fascia 12 includes a trim bezel 14 that surrounds the fog lamp 10. The trim bezel 14 may be constructed from a plastic material such as acrylonitrile butadiene styrene ("ABS") plastic and therefore may be sensitive to excessive heating.

The fog lamp 10 includes a housing 16 that covers and protects the internal components of the fog lamp 10 from water, road grime, and other debris. Additionally, the housing 16 includes mounting locations 18, which attach to corresponding receiving locations of the automobile. In other embodiments, the housing 16 may include other mounting hardware, such as threaded holes for receiving screws or bolts. The housing 16 may be constructed from any suitably durable material, including a plastic material, such as acrylonitrile butadiene styrene ("ABS") plastic, or a metallic material, such as aluminum, or a combination of materials.

The housing 16 is formed from a back shell 20 that is secured to a front shell 22. The back shell 20 and the front shell 22 may be joined using hardware, such as screws or bolts, adhesive, or using any other appropriate technique. In some embodiments, the back shell 20 and the front shell 22 may both be integral parts of the housing 16.

The fog lamp 10 includes a condenser lens 24 attached to the front shell 22 of the housing 16. The condenser lens 24 is constructed of optical glass and may be embodied as an aspheric lens with a substantially circular perimeter. The condenser lens 24 is secured to a corresponding opening in the front shell 22 by a circular trim bezel 26. The condenser lens 24 is described further below in connection with FIGS. 3 and 4.

As shown in FIG. 2, the fog lamp 10 further includes a reflector 28 positioned inside of the housing 16. In particular, the reflector 28 is be attached to an interior surface of the back shell 20. The reflector 28 is formed as a single monolithic piece of aluminum-coated ABS plastic. In other embodiments, the reflector 28 may be made of any other reflective material. In some embodiments, the reflector 28 may be embodied as an integral part of the back shell 20. The reflector 28 is a generally concave, polyellipsoidal reflector. In some embodiments, the curve of the reflector 28 may define one or more foci within the interior volume of the housing 16.

The fog lamp 10 further includes a light source 30 positioned in the housing 16. In particular, the light source 30 is attached to an interior surface of the back shell 20 and surrounded by the reflector 28. In the illustrative embodiment, the light source 30 is a 55-watt halogen fog lamp light bulb. In other embodiments, the light source 30 may be embodied as any incandescent light bulb, light emitting diode (LED), LED array, high-intensity discharge (HID) lamp, or other appropriate automotive light source. The fog lamp 10 further includes appropriate electrical connections 32 to connect the light source 30 to a vehicle power supply. The back shell 20 may include a mounting socket or other appropriate mounting hardware to connect the light source 30 to the electrical connections 32. In some embodiments, the light source 30 may be positioned at a focus of the reflector 28. In some embodiments, the fog lamp 10 may include a shade positioned at or near a second focus of the reflector 28 to prevent light emitted by the light source 30 from exiting directly through the condenser lens 24 without being reflected by the reflector 28.

In operation, as further described below in connection with FIG. 5, light emitted by the light source 30 is directed by the reflector 28 out of the fog lamp 10 through the condenser lens 24. Additionally, as further described below in connection with FIG. 6, certain light rays that enter the condenser lens 24 from outside of the fog lamp 10, such as solar rays, may be diffused and directed out of the fog lamp 10 by the condenser lens 24.

Figure 3:
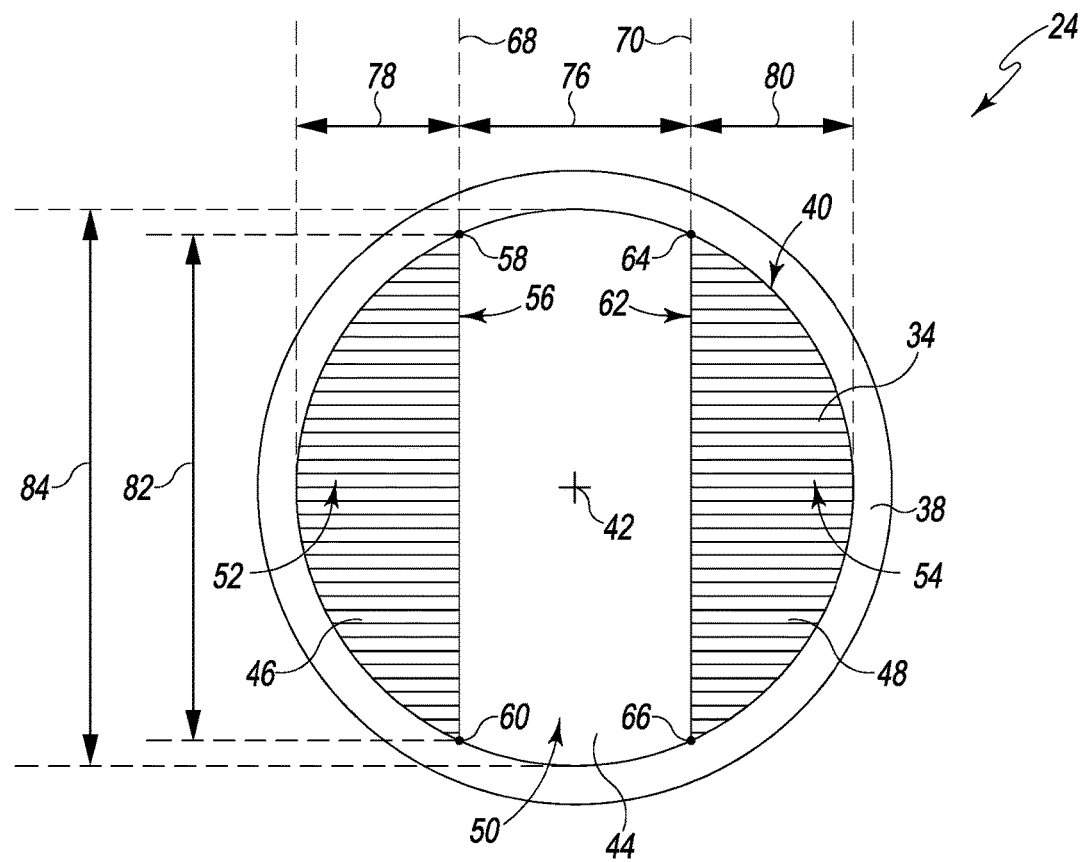
FIG. 3 is a front view of a condenser lens of the fog lamp of FIGS. 1 and 2.
Figure 4:
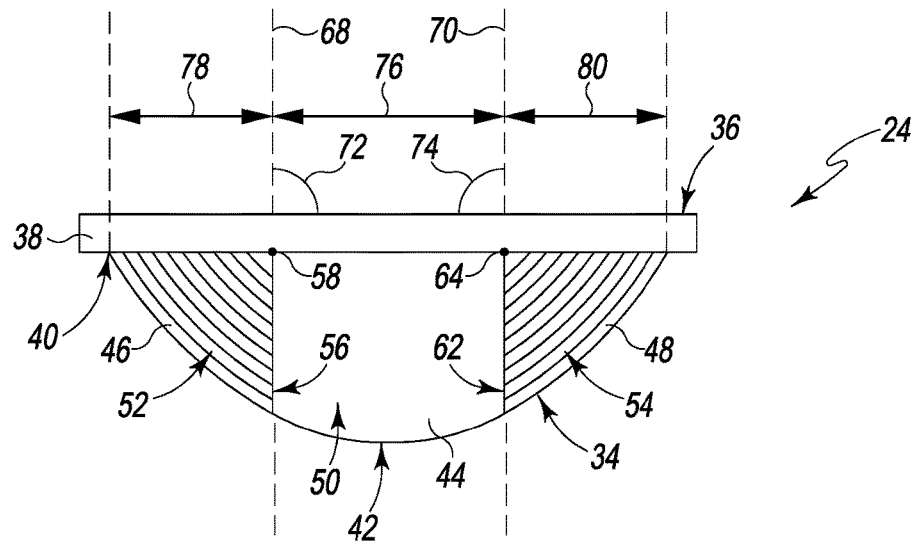
FIG. 4 is a top view of the condenser lens of the fog lamp of FIGS. 1 and 2.

Referring now to FIGS. 3 and 4, the condenser lens 24 is shown. As described above, the condenser lens 24 is constructed from optical glass. In some embodiments, the condenser lens 24 may be constructed from other refractive material. The condenser lens 24 has a convex front surface 34 positioned in front of a back surface 36. In the illustrative embodiment, the condenser lens 24 is as an aspheric lens; the front surface 34 has an aspheric curve, and the back surface 36 is substantially flat. The front surface 34 is surrounded by a flat circular flange 38. This part of the condenser lens 24 may be received by the front shell 22 and secured to the front shell 22 by the trim bezel 26.

The front surface 34 has a shape similar to a spherical dome, but is aspheric to reduce spherical, chromatic, or other optical aberrations. The front surface 34 has a substantially circular edge 40 at the boundary between the front surface 34 and the flange 38. The front surface 34 also has a center point 42, defined as the center of the circular edge 40. In the illustrative embodiment, the center point 42 is aligned with the light source 30 and one or more foci of the reflector 28 along an optical axis of the fog lamp 10 (not shown).

The front surface 34 includes a centrally-located emission region 44 defined between two diffusion regions 46, 48. The emission region 44 includes the center point 42 of the front surface 34. The emission region 44 has a polished or otherwise smooth surface 50 that allows light to be transmitted without substantial diffusion.

As described above, the front surface 34 includes two diffusion regions 46, 48. The diffusion regions 46, 48 each have a surface treatment that causes transmitted light to diffuse. Diffusing transmitted light thus causes light transmitted through the diffusion regions 46, 48 to spread out and reduce intensity. In the illustrative embodiment, the diffusion regions 46, 48 include horizontal knurling 50, 52. In particular, each of the diffusion regions 46, 48 may include 30-40 horizontal knurls 52, 54. Other embodiments may include any other surface treatment that causes diffusion. For example, in some embodiments, the diffusion regions 46, 48 may include vertical or concentric knurling, frosting, pillow optics, or any other surface texturing. Additionally, although illustrated as including two diffusion regions 46, 48, it should be understood that in other embodiments the condenser lens 24 may include fewer or additional diffusion regions.

The diffusion regions 46, 48 are positioned relative to the back surface 36 such that light rays entering the condenser lens 24 from outside of the fog lamp 10 through the diffusion regions 46, 48 may be diffused and directed out of the condenser lens 24 through the front surface 34. As shown in the illustrative embodiment, the diffusion regions 46, 48 are positioned on either side of the central emission region 44. In other words, each of the diffusion regions 46, 48 is positioned adjacent to opposite points of the edge 40, with the emission region 44 positioned between the diffusion regions 46, 48. As shown in FIGS. 1 and 2, the diffusion regions 46, 48 may be aligned horizontally in relation to the vehicle fog lamp 10 (that is, with one diffusion region 46, 48 in an inboard position and the other diffusion region 46, 48 in an outboard position). In some embodiments, horizontal positioning of the diffusion regions 46, 48 may reduce solar heating issues more effectively than other orientations.

As shown in FIGS. 3 and 4, the diffusion regions 46, 48 may be embodied as vertical sections of the front surface 34. In particular, the diffusion region 46 is bound by a portion of the circular edge 40 of the front surface 34 and by an edge 56 extending vertically between points 58, 60 positioned on the circular edge 40. Similarly, the diffusion region 46 is bound by another portion of the circular edge 40 and by an edge 62 extending vertically between points 64, 66 positioned on the circular edge 40. As shown, the edge 56 and the front surface 34 define an imaginary plane 68 that intersects the front surface 34 along the edge 56. Similarly, the edge 62 and the front surface 34 define an imaginary plane 70 that intersects the front surface 34 along the edge 62. The imaginary plane 68 cooperates with the back surface 36 to define a right angle 72. The imaginary plane 70 cooperates with the back surface 36 to define a right angle 74. In other embodiments, the angles 72, 74 may be acute or obtuse, and the angles 72, 74 may differ.

As shown, the imaginary planes 68, 70 are spaced apart by a horizontal width 76 defined between the edges 56, 62 of the emission region 44. The diffusion region 46 has a maximum horizontal width 78 defined between the edge 56 and the edge 40 of the front surface 34. The diffusion region 48 has a maximum horizontal width 80 defined between the edge 62 and the edge 40 of the front surface 34. In the illustrative embodiment, the diffusion regions 46, 48 are symmetrical and thus have equal maximum horizontal widths 78, 80. Additionally, as best shown in FIG. 3, each of the edges 56, 62 has a vertical length 82 that is less than the diameter 84 of the edge 40. As shown in FIG. 3, the diameter 84 is equivalent to the maximum vertical length of the emission region 44.

Although illustrated as symmetrical vertical sections, it should be understood that the diffusion regions 46, 48 may have any shape or size that allows light emitted by the fog lamp 10 to exit the condenser lens 24 through the emission region 44. In some embodiments, the shape, size, and/or position of the diffusion regions 46, 48 in relation to the emission region 44 may be determined to minimize unwanted solar effects without also affecting transmission of emitted light. For example, the horizontal width 76 of the emission region 44 may be reduced to a minimum width that does not affect transmission of emitted light. Similarly, the maximum horizontal widths 78, 80 of the diffusion regions 46, 48, respectively, may be increased to a maximum width that does not affect transmission of emitted light.

Figure 5:
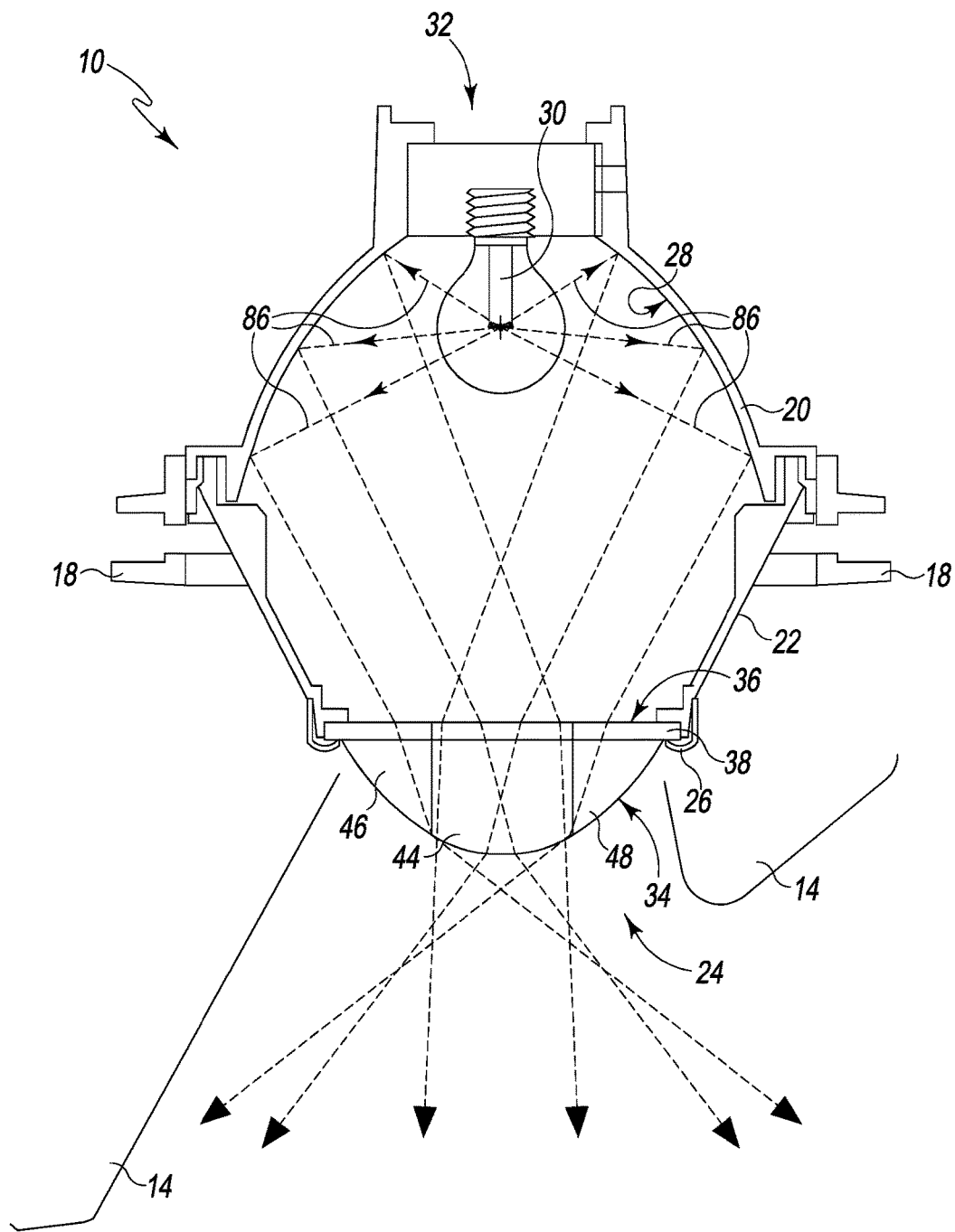
FIG. 5 is a schematic diagram of light rays emitted by the fog lamp of FIGS. 1 and 2.

Referring now to FIG. 5, as described above, the fog lamp 10 includes the light source 30 positioned within the reflector 28. Both of the light source 30 and the reflector 28 are positioned behind the condenser lens 24. In use, the light source 30 emits a number of light rays 86. Although illustrated as exemplary six light rays 86, it should be understood that each light ray 86 is an infinitely small abstraction of the luminous flux emitted by the light source 30 and thus the light source 30 may emit an infinite number of light rays 86. Additionally, the light source 30 may emit light rays in other directions that are not illustrated in FIG. 5 for clarity. As shown in FIG. 5, each of the emitted light rays 86 extends from the light source 30 to the reflector 28. Each of the emitted light rays 86 is reflected by the reflector 28 toward the condenser lens 24. Each of the emitted light rays 86 enters the condenser lens 24 through the back surface 36, is refracted by the condenser lens 24, and exits the condenser lens 24 through the front surface 34. In particular, each of the emitted light rays 86 exits the condenser lens 24 through the emission region 44 of the front surface 34. The emission region 44 and the diffusion regions 46, 48 are shaped, sized, and/or positioned such that the emitted light rays 86 do not exit the condenser lens 24 through the diffusion regions 46, 48. For example, the horizontal width 76 of the emission region 44 may be reduced to a minimum width that still allows all of the emitted light rays 86 to be transmitted through the emission region 44. Similarly, the maximum horizontal widths 78, 80 of the diffusion regions 46, 48, respectively, may be increased to a maximum width that still allows all of the emitted light rays 86 to be transmitted through the emission region 44. Because the emitted light rays 86 are transmitted through the emission region 44, they are not substantially diffused by the condenser lens 24. The emitted light rays 86 may continue to extend forward and illuminate the road surface.

Figure 6:
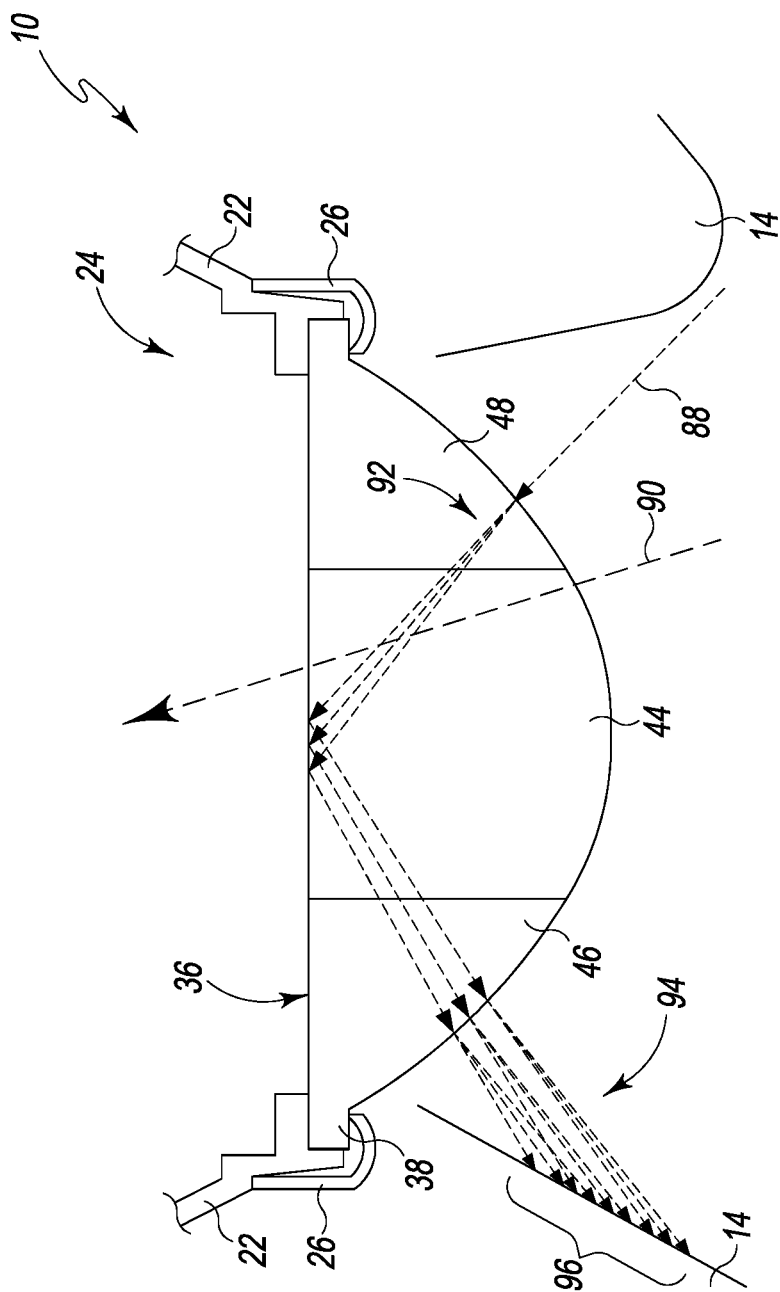
FIG. 6 is a schematic diagram of light rays entering the fog lamp of FIGS. 1 and 2.

Referring now to FIG. 6, a close-up view of the condenser lens 24 within the fog lamp 10 is shown. FIG. 6 illustrates light rays 88, 90 entering the condenser lens 24 from outside of the fog lamp 10. In many embodiments, the light rays 88, 90 are illustratively embodied as solar rays; that is, light rays originating from the sun. For example, in certain environments (e.g., in certain weather conditions, at certain times of day, when the fog lamp 10 is oriented in certain directions, etc.) light from the sun may enter the condenser lens 24. Additionally or alternatively, the light rays 88, 90 may originate from other sources (e.g., overhead lighting, oncoming traffic, etc.). Of course, it should be understood that light may enter the condenser lens 24 at many positions and from many different angles.

As shown, the light ray 88 enters the condenser lens 24 at a location within the diffusion region 48. As described above, the diffusion region 48 includes a surface treatment that causes transmitted light to diffuse (e.g., knurling, frosting, texturing, pillow optics, etc.). Diffusing the light ray 88 causes the light ray 88 to split into a number of child light rays 92. Although illustrated as splitting into three child rays 92, it should be understood that the light ray 88 may be diffused into a cone or other continuous distribution of light and thus may be represented by any number of child light rays 92. Diffusion causes the child light rays 92 to each have lower intensity than the parent light ray 88.

The child light rays 92 extend through the condenser lens 24 to the back surface 36. The child light rays 92 reflect off of the back surface 36 due to total internal reflection. "Total internal reflection" as used herein refers to a physical phenomenon that causes light to completely reflect when encountering, at certain angles, a boundary between media of different refractive indices. For example, in the illustrative embodiment, the back surface 36 is the boundary between the glass of the condenser lens 24 and the air included inside of the fog lamp 10. Glass and air have different refractive indices; therefore, light may reflect off of the back surface 36 due to total internal reflection. After reflecting off of the back surface 36, the child light rays 92 extend through the condenser lens 24 to the front surface 34. In particular, the child light rays 92 exit the condenser lens 24 through locations within the diffusion region 46. Similar to the diffusion region 48, the diffusion region 46 includes a surface treatment that diffuses transmitted light. Therefore, each of the child light rays 92 is itself diffused, causing each child light ray 92 to split into a number of child light rays 94. Thus, each of the child light rays 94 has lower intensity than its corresponding child light ray 92. The child light rays 94 extend out of the condenser lens 24.

Thus, as described above, the diffusion regions 46, 48 are positioned relative to the back surface 36 such that the light ray 88 is diffused and directed back out of the condenser lens 24 as a number of child light rays 94. As shown, the child light rays 94 may extend from the condenser lens 24 and intersect with the trim bezel 14 and/or other parts of the vehicle fascia 12. As shown in FIG. 6, the child light rays 94 are not focused on the fascia 12; that is, each of the child light rays 94 intersects the fascia 12 at a different location within a region 96 of the fascia 12. Therefore, the total light intensity associated with the light ray 88 is dispersed over the region 96, which in turn may reduce unwanted solar heating of the fascia 12. Although illustrated as being diffused by both diffusion regions 46, 48, it should be understood that in some embodiments the light ray 88 may be diffused by only one diffusion region. For example, in embodiments having a single diffusion region 46, the light ray 88 may be diffused once, when entering or when exiting the condenser lens 24.

Still referring to FIG. 6, the light ray 90 enters the condenser lens 24 at a location within the emission region 44. As described above, the emission region 44 has a substantially smooth surface 50, without a surface treatment to cause diffusion. Therefore, the light ray 90 propagates through the emission region 44 without being substantially diffused. As shown, the light ray 90 extends from the emission region 44 to the back surface 36 of the condenser lens 24. Because of its angle of incidence, the light ray 90 does not reflect off the back surface 36 due to total internal reflection. Instead, the light ray 90 passes through the back surface 36 into the interior of the fog lamp 10. Once inside the fog lamp 10, the light ray 90 may be absorbed by an internal component of the fog lamp 10 or directed by the reflector 28 back out of the fog lamp 10 through the condenser lens 24, similar to the light rays 86 as shown in FIG. 5. Thus, the light ray 90 may not be focused on the fascia 12.

Figure 7:
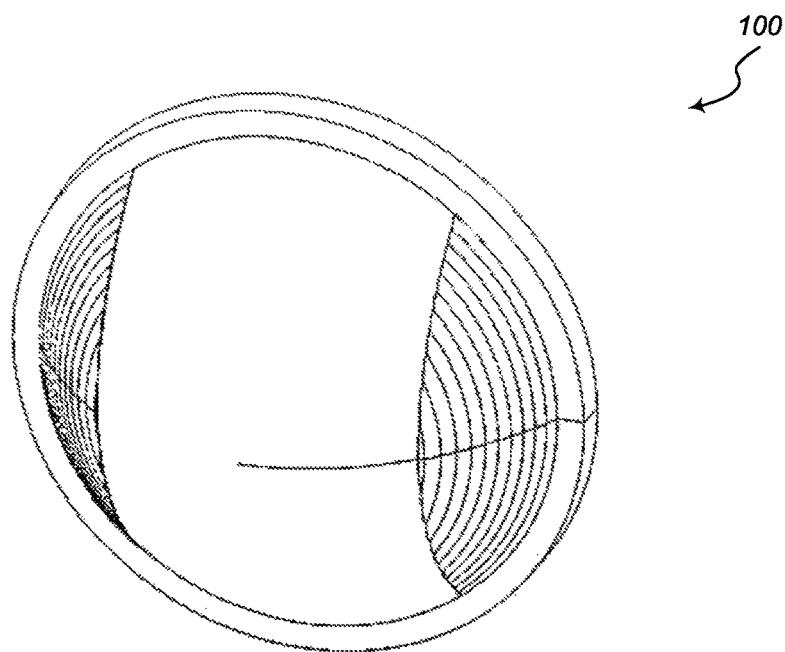
FIG. 7 is a perspective view of another embodiment of a condenser lens of the fog lamp of FIGS. 1 and 2.

Referring now to FIG. 7, a condenser lens 100 is shown. The condenser lens 100 may be used in the vehicle lamp 10, in place of the condenser lens 24. As shown, the front surface of the condenser lens 100 includes two diffusion regions that each include a radial knurling pattern, also known as a concentric knurling pattern. The radial knurling pattern is a surface treatment that causes transmitted light to diffuse.

Figure 8:
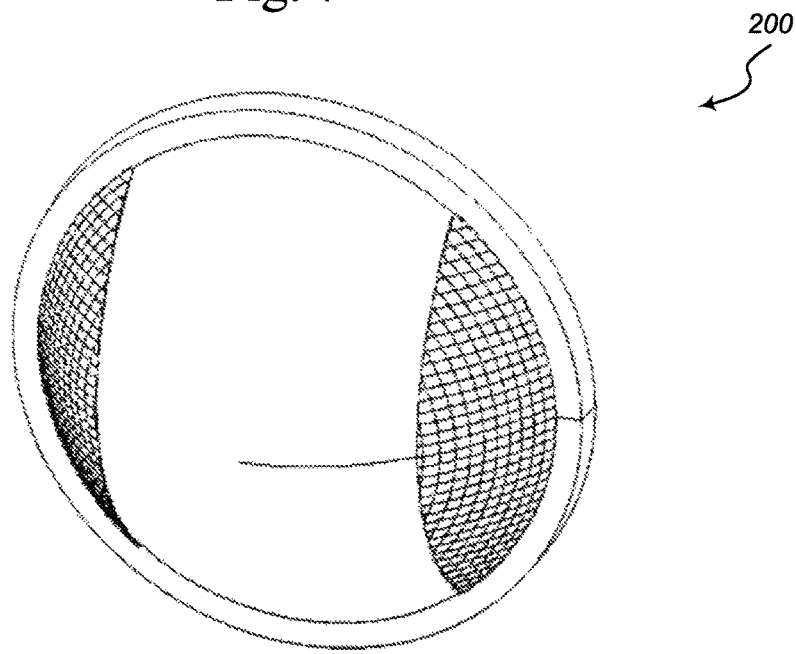
FIG. 8 is a perspective view of another embodiment of a condenser lens of the fog lamp of FIGS. 1 and 2.

Referring now to FIG. 8, a condenser lens 200 is shown. The condenser lens 200 may also be used in the vehicle lamp 10, in place of the condenser lens 24. As shown, the front surface of the condenser lens 200 includes two diffusion regions that each include pillow optics. The pillow optics are a surface treatment that causes transmitted light to diffuse.

There are a plurality of advantages of the present disclosure arising from the various features of the apparatus and system described herein. It will be noted that alternative embodiments of the apparatus and system of the present disclosure may not include all of the features described yet still benefit from at least some of the advantages of such features. Those of ordinary skill in the art may readily devise their own implementations of the apparatus and system that incorporate one or more of the features of the present invention and fall within the spirit and scope of the present disclosure.

What is claimed is:

1. An automotive lamp comprising:
  a condenser lens having a convex front surface and a back surface, wherein the front surface has (i) a center point, (ii) a first region that is substantially smooth and includes the center point, (iii) a second region including a surface treatment configured to split light rays entering the lamp from outside, and (iv) a third region spaced apart from the second region and including a surface treatment configured to split light rays; and P1
  a light source operable to generate and direct light through the condenser lens; wherein (i) when the light source is energized, all of the light generated by the light source is directed through the first region, (ii) the second region is positioned relative to the back surface such that when a light ray enters the lamp through the second region, the second region and the back surface cooperate to split the light ray into a first plurality of child light rays, and (iii) the third region is positioned relative to the back surface such that when the light ray enters the lamp through the second region, the first plurality of child light rays exit the lamp through the third region and are split by the third region into a second plurality of child light rays.

2. The automotive lamp of claim 1, wherein:
  the first region is adjacent to the second region; and
  an imaginary plane perpendicular to the back surface intersects the front surface to define a boundary between the first region and the second region.

3. The automotive lamp of claim 2, wherein:
  the first region is adjacent to the second region and adjacent to the third region;
  the second region extends from the first region to an inboard edge of the front surface of the condenser lens; and
  the third region extends from the first region to an outboard edge of the front surface of the condenser lens.

4. The automotive lamp of claim 3, wherein:
  a first imaginary plane perpendicular to the back surface intersects the front surface to define a first boundary between the first region and the second region; and
  a second imaginary plane perpendicular to the back surface intersects the front surface to define a second boundary between the first region and the third region.

5. The automotive lamp of claim 4, wherein the first boundary and the second boundary are spaced apart by a width of the first region.

6. The automotive lamp of claim 1, wherein the surface treatment of the second region comprises a frosted surface treatment, a knurled surface treatment comprising a series of horizontal lines, a knurled surface treatment comprising a series of curved lines, or a pillow optics surface treatment.

7. The automotive lamp of claim 1, further comprising an external housing adapted for installation in an automobile, wherein the condenser lens is adapted to fit through an opening in a front fascia of the automobile.

8. A condenser lens for an automotive lamp, the condenser lens comprising:
  a convex front surface having (i) a circular perimeter, (ii) a center point, (iii) a first region that is substantially smooth and includes the center point, (iv) a second region including a surface treatment configured to split light rays entering the lamp from outside, and (v) a third region spaced apart from the second region and including a surface treatment configured to split light rays; and
  a back surface positioned behind the front surface;
  wherein the second region is positioned relative to the back surface such that when a light ray enters the condenser lens through the second region, the second region and the back surface cooperate to split the light ray into a first plurality of child light rays, and
  wherein the third region is positioned relative to the back surface such that whim the light ray enters the condenser lens through the second region, the first plurality of child light rays exit the condenser lens through the third region and are split by the third region into a second plurality of child light rays.

9. The condenser lens of claim 8, wherein:
  the first region is adjacent to the second region; and
  an imaginary plane positioned at an angle relative to the back surface intersects the front surface to define a boundary between the first region and the second region.

10. The condenser lens of claim 9, wherein the imaginary plane is perpendicular to the back surface.

11. The condenser lens of claim 9, wherein:
  the first region is adjacent to the second region and adjacent to the third region;
  the second region extends from the first region to a first point on the circular perimeter of the front surface of the condenser lens; and
  the third region extends from the first region to a second point on the circular perimeter of the front surface of the condenser lens, wherein the second point is opposite the first point.

12. The condenser lens of claim 11, wherein:
a first imaginary plane perpendicular to the back surface intersects the front surface to define a first boundary between the first region and the second region; and
a second imaginary plane perpendicular to the back surface and parallel to the first imaginary plane intersects the front surface to define a second boundary between the first region and the third region.

13. The condenser lens of claim 12, wherein the first boundary and the second boundary are spaced apart by a width of the first region.

14. The condenser lens of claim 13, wherein the width of the first region has a predefined relationship to a diameter of the circular perimeter of the front surface.

15. The condenser lens of claim 8, wherein the surface treatment of the second region comprises a frosted surface treatment, a knurled surface treatment comprising a series of horizontal lines, a knurled surface treatment comprising a series of curved lines, or a pillow optics surface treatment.

16. A method
comprising: activating a lamp for an automobile to generate light;
directing all of the generated light through a first surface region of the lamp, the first surface region being substantially smooth;
diffusing a light ray entering the lamp from outside through a second surface region of the lamp, the second surface region including a surface treatment that splits the light ray into a first plurality of child light rays;
reflecting the first plurality of child light rays out of the lamp through a third surface region of the lamp, the third surface region including the surface treatment that diffuses splits transmitted light; and
splitting the first plurality of child light rays exiting the lamp through the third surface region into a second plurality of child light rays.

17. The automotive lamp of claim 1, wherein the front surface is an aspheric front surface, the front surface has a polyellipsoidal reflector positioned behind the condenser lens, and a support is coupled between the reflector and the condenser lens;
the back surface is a substantially flat back surface;
the light source is positioned behind the condenser lens;
the light source and the polyellipsoidal reflector are operable to generate and direct light through the condenser lens; and
when the light source is energized, all of the light generated by the light source and reflected by the polyellipsoidal reflector is directed through the first region.

* * * * *